United States Patent
Schanke et al.

(10) Patent No.: US 7,660,926 B2
(45) Date of Patent: Feb. 9, 2010

(54) APPARATUS AND METHOD FOR A CORE FOR IMPLEMENTING A COMMUNICATIONS PORT

(75) Inventors: Morten Schanke, Oslo (NO); Knut Tvete, Løvenstad (NO); Steinar Forsmo, Oslo (NO)

(73) Assignee: Sun Microsystems, Inc., Santa Clara, CA (US)

( * ) Notice: Subject to any disclaimer, the term of this patent is extended or adjusted under 35 U.S.C. 154(b) by 175 days.

(21) Appl. No.: 11/280,155

(22) Filed: Nov. 16, 2005

(65) Prior Publication Data

US 2007/0112992 A1   May 17, 2007

(51) Int. Cl.
   *G06F 13/372* (2006.01)
(52) U.S. Cl. .................. 710/124; 714/758; 370/294; 370/321; 370/314
(58) Field of Classification Search ............ 370/294, 370/321, 314, 280; 710/117, 124, 105, 107, 710/316; 714/758
See application file for complete search history.

(56) References Cited

U.S. PATENT DOCUMENTS

| | | | | |
|---|---|---|---|---|
| 4,007,448 A * | 2/1977 | Sergeant et al. | ............... | 710/36 |
| 4,467,444 A * | 8/1984 | Harmon et al. | ............... | 712/42 |
| 4,816,992 A * | 3/1989 | Matsumoto | ................ | 710/260 |
| 5,612,954 A * | 3/1997 | Sandquist | ................... | 370/244 |
| 5,867,731 A * | 2/1999 | Williams et al. | ............... | 710/29 |
| 6,061,358 A * | 5/2000 | Nelson et al. | ............... | 370/412 |
| 6,233,635 B1 * | 5/2001 | Son | ............................ | 710/315 |
| 6,279,057 B1 * | 8/2001 | Westby | ........................ | 710/52 |
| 6,308,239 B1 * | 10/2001 | Osakada et al. | ............. | 710/316 |
| 6,473,424 B1 * | 10/2002 | DeJager et al. | ............... | 370/389 |
| 6,801,971 B1 * | 10/2004 | Devine et al. | ............... | 710/107 |
| 6,839,793 B2 * | 1/2005 | Ragland | ..................... | 710/316 |
| 6,874,050 B2 * | 3/2005 | Tangen | ....................... | 710/300 |
| 6,988,161 B2 * | 1/2006 | McConnell et al. | ......... | 710/316 |
| 7,099,969 B2 * | 8/2006 | McAfee et al. | ............. | 710/107 |
| 7,110,413 B2 * | 9/2006 | Riley | .......................... | 370/401 |
| 7,174,411 B1 * | 2/2007 | Ngai | .......................... | 710/316 |
| 2004/0088469 A1 * | 5/2004 | Levy | ........................... | 710/316 |
| 2004/0200631 A1 * | 10/2004 | Chen | ........................... | 174/36 |
| 2005/0122982 A1 * | 6/2005 | Li et al. | ................. | 370/395.41 |
| 2005/0160188 A1 * | 7/2005 | Bogin et al. | ................... | 710/1 |
| 2005/0216814 A1 * | 9/2005 | Thomas | ..................... | 714/758 |

OTHER PUBLICATIONS

PCI-SIG. PCI Express Base Specification Revision 1.0a. Apr. 15, 2003. p. 402.*
Computer Dictionary Online. "Finite State Machine" definition. www.computer-dictionary-online.org. 2009.*
Ientilucci, Emmett. Pro Tools and Time Division Multiplexing (TDM). Rochester Institute of Technology. May 23, 2007.*
Wang et al. Experimental Demonstration of End-to-End PCI Express Communication over a Transparent All-Optical Photonic Interconnection Network Interface. 2009.*
Aculab. Multi-purpose TDM boards from Aculab. Datasheet. Oct. 2008.*

* cited by examiner

*Primary Examiner*—Mark Rinehart
*Assistant Examiner*—Matthew D Spittle
(74) *Attorney, Agent, or Firm*—Park, Vaughn & Fleming LLP

(57) ABSTRACT

There is described an apparatus and method for implementing a communications port. The apparatus comprises a core, which is operable to divide the port into a plurality of sub-ports by dividing a data transfer capacity of the port among the plurality of sub-ports using time division multiplexing. Each sub-port is allocated a corresponding data transfer capacity.

15 Claims, 9 Drawing Sheets

APPARATUS AND METHOD FOR A CORE FOR IMPLEMENTING A COMMUNICATIONS PORT

RELATED APPLICATIONS

This application is related to U.S. patent application Ser. No. 11/280,148, entitled "Buffer for Output and Speed Matching", Ser. No. 11/280,152, entitled "Dynamic Buffer Space Allocation" and Ser. No. 11/280,154, entitled "Dynamic Retry Buffer", all of which were filed Nov. 16, 2005.

BACKGROUND

This invention relates to an apparatus and method for implementing a communications port.

In many computer environments, a fast and flexible interconnect system can be desirable to provide connectivity to devices capable of high levels of data throughput. In the fields of data transfer between devices in a computing environment, PCI Express (PCI-E) can be used to provide connectivity between a host and one or more client devices or endpoints. PCI Express is becoming a de-facto I/O interconnect for servers and desktop computers. PCI Express allows physical system decoupling (CPU <-> I/O) through high-speed serial I/O. The PCI Express Base Specification 1.0 sets out behavior requirements of devices using the PCI Express interconnect standard. According to the Specification, PCI Express is a host to endpoint protocol where each endpoint connects to a host and is accessible by the host. PCI Express imposes a stringent tree structure relationship between I/O Devices and a Root Complex.

Communications ports such as ports which support PCI Express can have a data transfer capacity (bandwidth) of up to 80 Gbits/s in each direction of data flow. In some applications, not all of this capacity will be required on a given port at any given time.

Ports are typically implemented using hardware in which the area available ("real estate") on, for example, an integrated circuit such as an application specific integrated circuit (ASIC) is at a premium. It is therefore desirable to implement a port using a minimum of components, and in a manner which requires a minimum of real estate.

SUMMARY OF THE INVENTION

The present invention has been made, at least in part, in consideration of problems and drawbacks of conventional systems.

An aspect of the invention provides apparatus including a core for implementing a communications port. The core is operable to divide the port into a plurality of sub-ports by dividing a data transfer capacity of the port among the plurality of sub-ports using time division multiplexing. Each sub-port is allocated a corresponding data transfer capacity.

Dividing the transfer capacity of a port among a plurality of sub-ports using time division multiplexing can allow a plurality of narrower sub-ports to be implemented. This provides additional flexibility for data transfer. Since a single core is employed to divide the capacity of the port among the sub-ports, components of the core can be shared among the sub-ports, whereby ports (sub-ports) having various different data transfer capacities can be implemented using less real estate.

The apparatus described above can be implemented as, for example, an integrated circuit such as an application specific integrated circuit (ASIC) or an IP block including the described core. The integrated circuit can be provided in a switch. The core can also be included in a computer system—for example as part of an ASIC or IP block of the computer system including the core.

A further aspect of the invention provides a method for implementing a communications port. The method includes a core dividing the port into a plurality of sub-ports by dividing a data transfer capacity of the port among the plurality of sub-ports using time division multiplexing. Each sub-port is allocated a corresponding data transfer capacity.

Although various aspects of the invention are set out in the accompanying independent claims, other aspects of the invention include any combination of features from the described embodiments and/or the accompanying dependent claims, and not solely the combinations set out in the accompanying claims.

BRIEF DESCRIPTION OF THE FIGURES

Specific embodiments of the present invention will now be described by way of example only with reference to the accompanying Figures in which.

Figure 1:
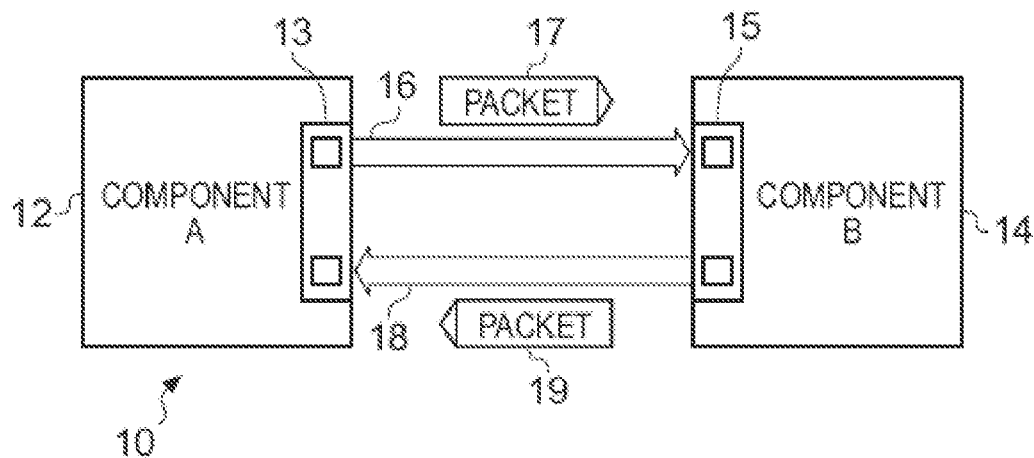
FIG. 1 is a schematic representation of a PCI Express connection.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DESCRIPTION OF PARTICULAR EMBODIMENTS

Embodiments of the invention are described in the following with reference to an example of an interconnect apparatus for supporting PCI Express.

The PCI Express 1.0 standard set out in the PCI Express Base Specification 1.0 available from the PCI (Peripheral Component Interconnect) Special Interest Group (www.pcisig.com) is one example of a computer interconnect standard. The PCI Express architecture is a high performance, general purpose I/O interconnect defined for a wide variety of existing and future computing and communication platforms. Key attributes from the original PCI architecture, such as its usage model, load-store architecture, and software interfaces, are maintained. On the other hand, the parallel bus implementation of PCI is replaced in PCI Express by a highly scalable, fully serial interface. Among the advanced features supported by PCI Express are power management, Quality of Service (QoS), hot-plug/hot-swap support, data integrity, and error handling. PCI Express is also backwards compatible with the software models used to describe PCI, such that PCI Express hardware can be detected and configured using PCI system configuration software implementations with no modifications.

With reference to FIG. 1, there will now be described the basic point-to-point communications channel provided by PCI Express. A component collection consisting of two ports and the lanes connecting those ports can be referred to as a link. A link represents a dual-simplex communications channel between two components. As shown in FIG. 1, in its simplest form, a link 10 includes two components 12 and 14, each including a respective transmit and receive port pair 13 and 15. Two uni-directional, low-voltage, differentially driven channels 16 and 18 connect the ports of the components, one channel in each direction. The channel pair can be referred to as a lane. The channels 16 and 18 each carry packets 17 and 19 between the components. According to the PCI Express 1.0 specification, each lane provides an effective data transfer rate of 2.5 Gigabits/second/lane/direction. For circumstances where this data bandwidth is insufficient, to scale bandwidth, a link may aggregate multiple lanes denoted by ×N where N may be any of the supported link widths. An ×8 link represents an aggregate bandwidth of 20 Gigabits/second of raw bandwidth in each direction. This base specification 1.0 describes operations for ×1, ×2, ×4, ×8, ×12, ×16, and ×32 lane widths. According to the specification only symmetrical links are permitted, such that a link includes the same number of lanes in each direction.

Figure 2:
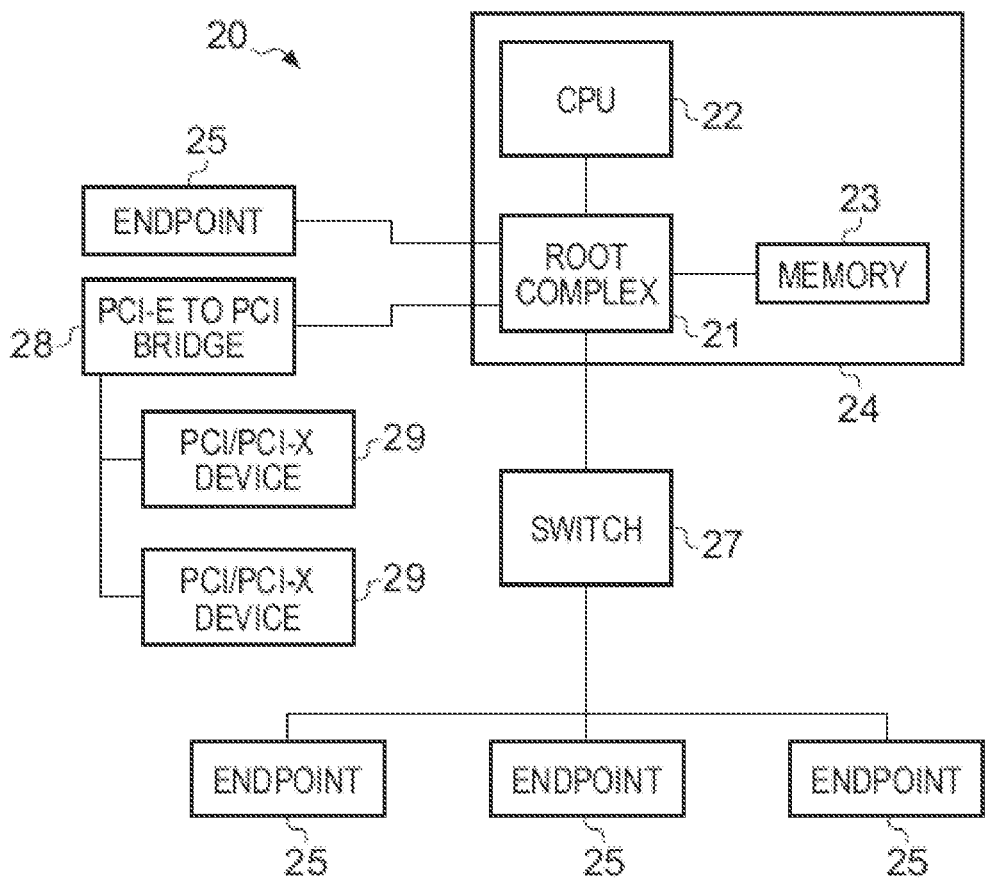
FIG. 2 is a schematic representation of an example of a PCI Express fabric topology.

With reference to FIG. 2, there will now be described an example of a PCI Express fabric topology 20. A fabric is composed of point-to-point links that interconnect a set of components. In the example of FIG. 2, there is shown a single fabric instance 20 referred to as a hierarchy, composed of a root complex 21, multiple endpoints 25 (such as I/O devices), a switch 27, and a PCI Express to PCI Bridge 28, all interconnected via PCI Express links. The root complex 21 can be connected to a CPU 22 and memory 23 subsystem which requires access to the I/O facilitated by the PCI Express fabric. The combination of root complex, CPU and memory can be referred to as a host 24. Each of the components of the topology is mapped in a single flat address space and can be accessed using PCI-like load/store accesses transaction semantics.

A root complex 21 is the root of an I/O hierarchy that connects the CPU/memory subsystem to the I/O. As illustrated in FIG. 2, a root complex 21 may support one or more PCI Express ports. Each interface defines a separate hierarchy domain. Each hierarchy domain may be composed of a single endpoint or a sub-hierarchy containing one or more switch components and endpoints. The capability to route peer-to-peer transactions between hierarchy domains through a root complex is optional and implementation dependent. For example, an implementation may incorporate a real or virtual switch internally within the root complex to enable full peer-to-peer support in a software transparent way.

An endpoint 25 is a type of device that can be the requester or completer of a PCI Express transaction either on its own behalf or on behalf of a distinct non-PCI Express device (other than a PCI device or Host CPU). Examples of endpoints include: a PCI Express attached graphics controller, a PCI Express-USB host controller, and a PCI Express attached network interface such as an Ethernet MAC/PHY or InfiniBand Host Channel Adapter (HCA).

Figure 3:
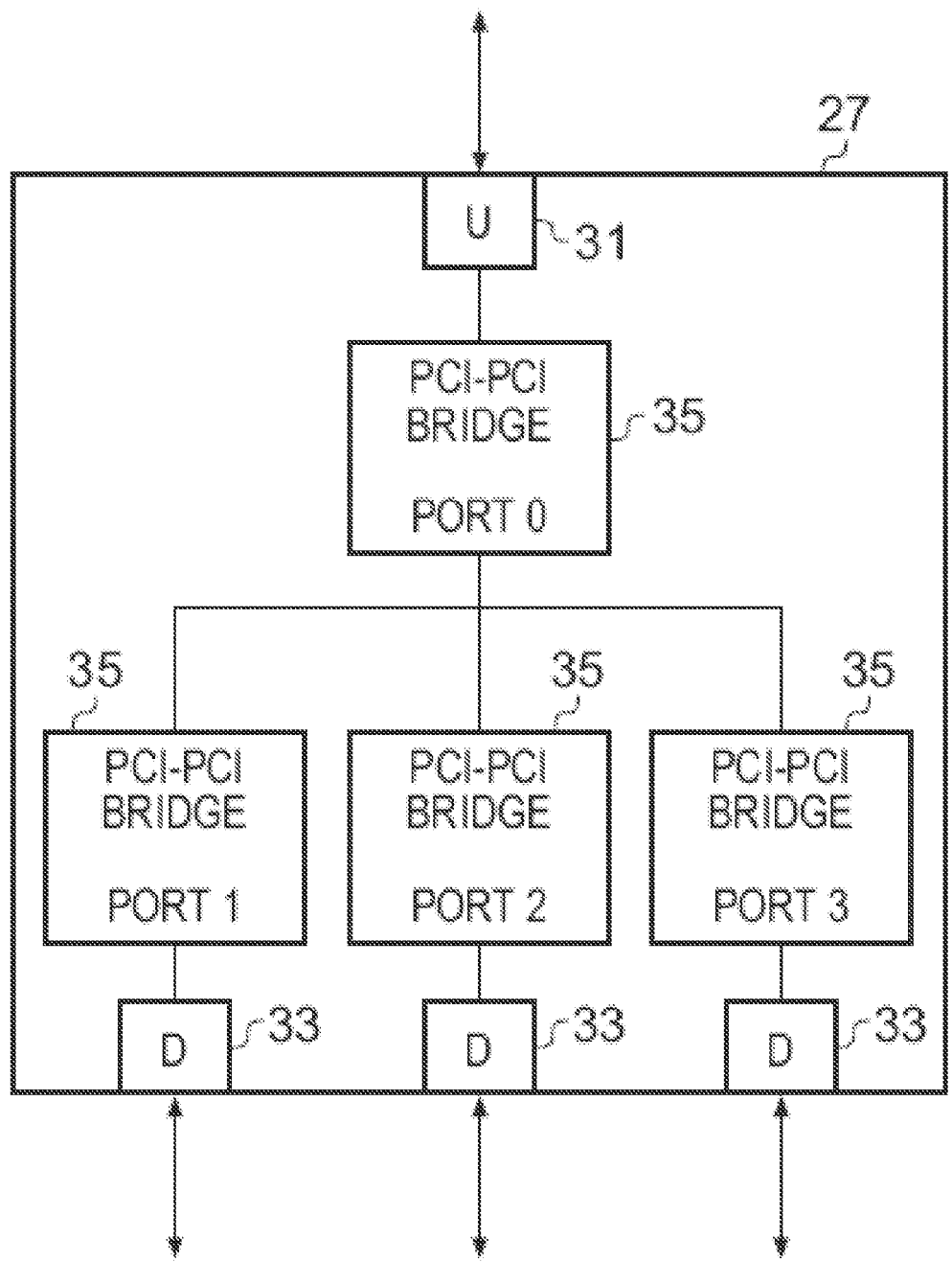
FIG. 3 is a schematic representation of a PCI Express switch.

A switch 27 is a logical assembly of multiple virtual PCI Express to PCI Express bridge devices as illustrated in FIG. 3. As shown in FIG. 3, an upstream port 31 which connects in the direction of a host connects to a number of downstream ports 33 via a switch fabric made up of a number of virtual PCI Express to PCI Express bridges. Switches are governed by a number of rules. Amongst these rules is a requirement that switches appear to configuration software as two or more logical virtual PCI Express to PCI Express bridges and forward transactions using PCI bridge mechanisms; e.g., address based routing. Also, a switch is not allowed to split a packet into smaller packets, e.g., a single packet with a 256-byte payload must not be divided into two packets of 128 bytes payload each. Each virtual PCI Express to PCI Express bridge 35 can be a physical PCI Express to PCI Express bridge or can be an alternative physical structure which is controlled to behave as a PCI Express to PCI Express bridge.

A PCI Express to PCI bridge 28 provides a connection between a PCI Express fabric and a PCI/PCI-X hierarchy. Thereby, conventional PCI/PCI-X devices 29 may be connected to the PCI Express fabric and accessed by a host including a PCI Express root complex.

A PCI Express fabric can be configured using one of two mechanisms. These are: a PCI compatible configuration mechanism which supports 100% binary compatibility with operating systems and host firmware and their corresponding bus enumeration and configuration software that is compatible with PCI rev 2.3 or later; and a PCI Express enhanced configuration mechanism which is provided to increase the size of available configuration space and to optimize access mechanisms.

Each PCI Express link is mapped through a virtual PCI-to-PCI bridge structure and has a logical PCI bus associated with it. The virtual PCI-to-PCI bridge structure may be part of a PCI Express root complex port, a switch upstream port, or a switch downstream port. A root port is a virtual PCI-to-PCI bridge structure that originates a PCI Express hierarchy domain from a PCI Express root complex. Logical devices are mapped into configuration space such that each will respond to a particular device number.

Figure 4:
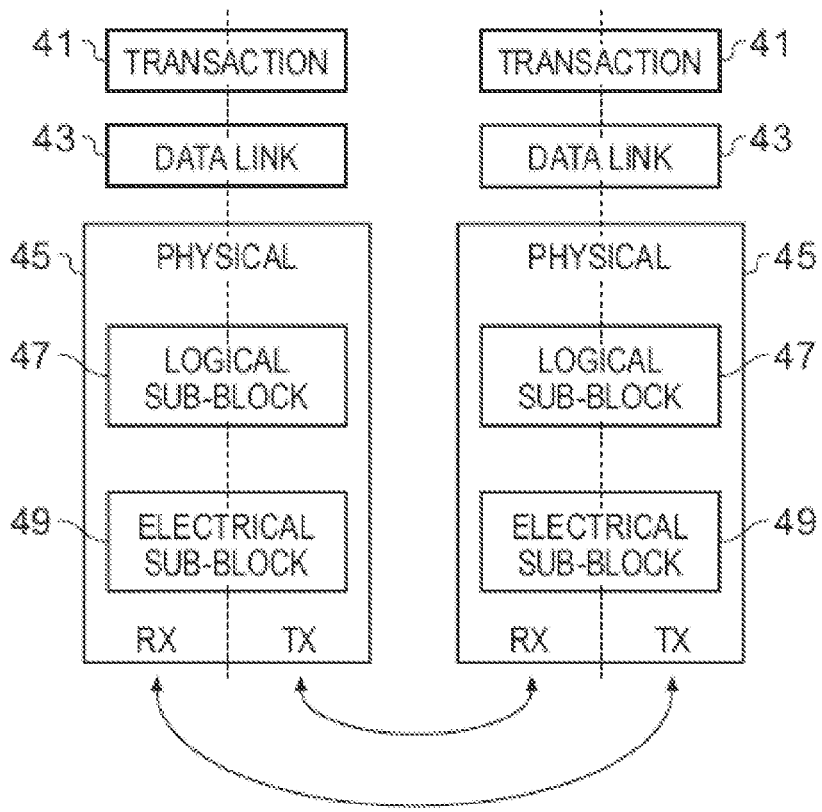
FIG. 4 is a schematic overview of layering within PCI Express.

A schematic overview of the PCI Express architecture in layers is shown in FIG. 4. As shown, there are three discrete logical layers: the transaction layer 41, the data link layer 43, and the physical layer 45. Each of these layers is divided into two sections: one that processes outbound (to be transmitted) information and one that processes inbound (received) information.

PCI Express uses packets to communicate information between components. Packets are formed in the transaction and data link layers to carry the information from the transmitting component to the receiving component. As the transmitted packets flow through the other layers, they are extended with additional information necessary to handle packets at those layers. At the receiving side the reverse process occurs and packets get transformed from their physical layer representation to the data link layer representation and finally (for transaction layer packets) to the form that can be processed by the transaction layer of the receiving device.

Figure 5:
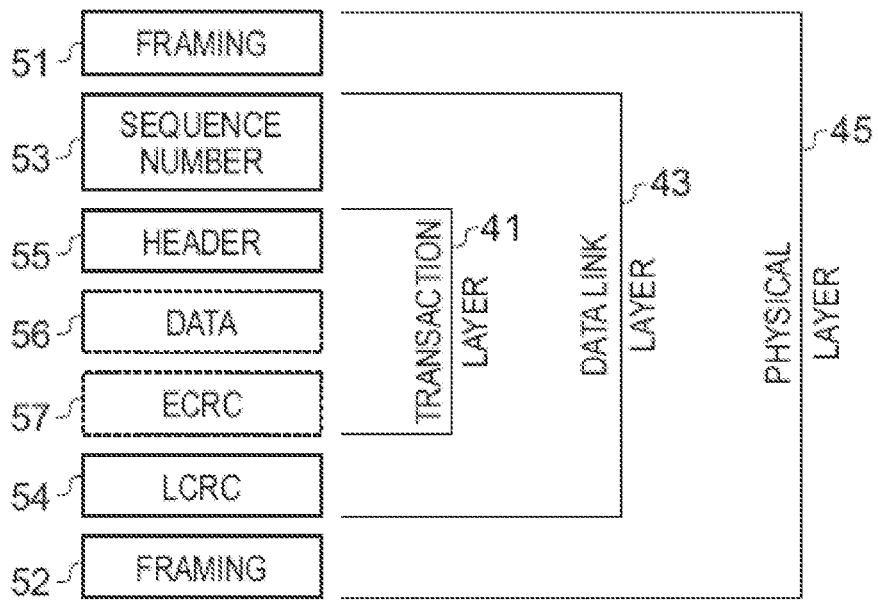
FIG. 5 is a schematic representation of packet flow through the layers shown in FIG. 4.

A conceptual overview of the flow of transaction level packet information through the layers is shown in FIG. 5. Thus the transaction layer 41 provides a packet header 55, and can provide a data payload 56 and an optional end-to-end cyclic redundancy check (ECRC) 57. The data link layer applies a sequence number 53 and a LCRC (Link Cyclic Redundancy Check) 54. The physical layer 45 then provides Framing 51, 52 for the packet. A simpler form of packet communication is supported between two data link layers (connected to the same link) for the purpose of link management.

The upper layer of the architecture is the transaction layer 41. The transaction layer's primary responsibility is the assembly and disassembly of Transaction Layer Packets (TLPs). TLPs are used to communicate transactions, such as read and write, as well as certain types of events. The transaction layer is also responsible for managing credit-based flow control for TLPs.

Every request packet requiring a response packet is implemented as a split transaction. Each packet has a unique identifier that enables response packets to be directed to the correct originator. The packet format supports different forms of addressing depending on the type of the transaction (Memory, I/O, Configuration, and Message). The packets may also have attributes such as no Snoop and relaxed ordering.

The transaction layer supports four address spaces: the three PCI address spaces (memory, I/O, and configuration) and a message space. According to the PCI Express specification, the message space is used to support all prior sideband signals, such as interrupts, power-management requests, and so on, as in-band message transactions. PCI Express message transactions can be considered as "virtual wires" since their effect is to eliminate the wide array of sideband signals used in a conventional platform implementation.

The middle layer in the stack, the data link layer 43, serves as an intermediate stage between the transaction layer 41 and the physical layer 45. The primary responsibilities of the data link layer 41 include link management and data integrity, including error detection and error correction.

The transmission side of the data link layer 43 accepts TLPs assembled by the transaction layer 41, calculates and applies a data protection code and TLP sequence number, and submits them to physical layer 45 for transmission across the link. The receiving data link layer 43 is responsible for checking the integrity of received TLPs and for submitting them to the transaction layer 41 for further processing. On detection of TLP error(s), this layer is responsible for requesting retransmission of TLPs until information is correctly received, or the link is determined to have failed.

The data link layer 43 also generates and consumes packets that are used for link management functions. To differentiate these packets (TLP) from those used by the transaction layer, the term Data Link Layer Packet (DLLP) is used when referring to packets that are generated and consumed at the data link layer.

The physical layer 45 includes all circuitry (electrical sub-block 49) for interface operation, including driver and input buffers, parallel-to-serial and serial-to-parallel conversion, PLL(s) (Phase-locked-loops), and impedance matching circuitry. It includes also logical functions (logic sub-block 47) related to interface initialization and maintenance. The physical layer 45 exchanges information with the data link layer 43 in an implementation-specific format. This layer is responsible for converting information received from the data link layer 43 into an appropriate serialized format and transmitting it across the PCI Express link at a frequency and width compatible with the device connected to the other side of the link.

The PCI Express architecture has various facilities to support future performance enhancements via speed upgrades and advanced encoding techniques. Depending on actual implementation of these enhancements, the future speeds, encoding techniques or media may only impact the physical layer definition.

The transaction layer 41, in the process of generating and receiving TLPs, exchanges flow control information with its complementary transaction layer 41 on the other side of the link. It is also responsible for supporting both software and hardware-initiated power management.

Initialization and configuration functions require the transaction layer 41 to store link configuration information generated by the processor or management device and store link capabilities generated by physical layer hardware negotiation of width and operational frequency.

A transaction layer's packet generation and processing services require it to: generate TLPs from device core requests; convert received request TLPs into requests for the device core; convert received completion packets into a payload, or status information, deliverable to the core; detect unsupported TLPs and invoke appropriate mechanisms for handling them; and if end-to-end data integrity is supported, generate the end-to-end data integrity CRC and update the TLP header accordingly.

Within flow control, the transaction layer 41 tracks flow control credits for TLPs across the link. Transaction credit status is periodically transmitted to the remote transaction layer using transport services of the data link layer. Remote flow control information is used to throttle TLP transmission.

The transaction layer 41 can also implement ordering rules including the PCI/PCI-X compliant producer consumer ordering model and extensions to support relaxed ordering.

Power management services within the transaction layer 41 may include: ACPI/PCI power management, as dictated by system software; and hardware-controlled autonomous power management minimizes power during full-on power states.

The transaction layer 41 can also implement handling of virtual channels and traffic class. The combination of virtual channel mechanism and traffic class identification is provided to support differentiated services and QoS (Quality of Service) support for certain classes of applications. Virtual channels provide a means to support multiple independent logical data flows over given common physical resources of the link. Conceptually this involves multiplexing different data flows onto a single physical link. The traffic class is a transaction layer packet label that is transmitted unmodified end-to-end through the fabric. At every service point (e.g., switch) within the fabric, traffic class labels are used to apply appropriate servicing policies. Each traffic class label defines a unique ordering domain—no ordering guarantees are provided for packets that contain different traffic class labels.

The data link layer 43 is responsible for reliably exchanging information with its counterpart on the opposite side of the link. Accordingly, it has responsibility for initialization and power management services to: accept power state requests from the transaction layer 41 and convey them to the physical layer 45; and to convey active/reset/disconnected/power managed state information to the transaction layer 41.

The data link layer 43 also provides data protection, error checking, and retry services including: CRC generation; transmitted TLP storage for data link level retry; error checking; TLP acknowledgment and retry messages; and error indication for error reporting and logging.

The physical layer 45 provides services relating to interface initialization, maintenance control, and status tracking, including: reset/hot-plug control/status; Interconnect power management; width and lane mapping negotiation; and polarity reversal. The physical layer 45 can also provide services relating to symbol and special ordered set generation including: 8-bit/10-bit encoding/decoding; and embedded clock tuning and alignment.

Within symbol transmission and alignment, the physical layer 45 can provide services including: transmission circuits; reception circuits; elastic buffer at receiving side; and multi-lane de-skew (for widths >×1) at receiving side. The physical layer 45 can also provide system DFT (Design For Test) support features.

The inter-layer interfaces support the passing of packets and management information. The transaction/data link interface provides: byte or multi-byte data to be sent across the link (including a local TLP-transfer handshake mechanism, and TLP boundary information); and requested power state for the link. The data link to transaction interface provides: byte or multi-byte data received from the PCI Express link; TLP framing information for the received byte; actual power state for the link; and link status information.

The data link to physical interface provides: byte or multi-byte wide data to be sent across the link (including a data transfer handshake mechanism and TLP and DLLP boundary information for bytes); and requested power state for the link. The physical to data link interface provides: byte or multi-byte wide data received from the PCI Express link; TLP and DLLP framing information for data; indication of errors detected by the physical layer; actual power state for the link; and connection status information.

Thus there has now been described an overview of the basic principles of the PCI Express interface architecture. Further information regarding the architecture can be obtained from the PCI Special Interest Group and from a variety of texts describing the architecture, such as "Introduction to PCI Express: A Hardware and Software Developer's Guide" ISBN: 0970284691, and "PCI Express System Architecture" ISBN: 0321156307.

The PCI Express interface architecture is described by way of example only, and it is envisaged that embodiments of this invention can be implemented in other architectures and under different standards than the PCI Express standard.

Returning briefly to FIGS. 2 and 3, it will be appreciated that a number of ports are generally required for connecting, for example, a host computer 24 to one or more end points 25. As is shown in FIG. 3, these ports can be present in a switch such as switch 27. Circuitry for implementing these ports can, for example, be included in an application specific integrated circuit (ASIC). ASICs or such like incorporating the circuitry can also be provided in the end points 25 and in the host computer 24, whereby data can be sent and received over a data link as described above in relation to FIG. 1.

As described above, a communications port such as a port implemented in PCI Express can have a high data transfer capacity (up to 80 Gbits/s in each direction of data flow). It will be appreciated that not all end points require such a high transfer capacity. For example, as seen in FIG. 2, the three end points 25 which are connected to the switch 27 may each have different data transfer capacity requirements. These requirements may be far lower than the maximum capacity offered by PCI Express. As described in relation to FIG. 3, a separate port can be provided for each end point 25 in, for example, a switch. The data transfer capacity of each separate port can be tailored to the data transfer capacity requirements of the end point 25 to which it is to be connected. Each port can be implemented using separate circuitry.

However, where separate circuitry is provided for each of a plurality of ports, a relatively high overhead in terms of real estate on, for example, an ASIC is involved. Furthermore, providing the full data transfer capacity available using PCI Express to each port can potentially amount to overkill in terms of bandwidth and the number of data lanes which are required.

According to an embodiment of the invention, a communications port can be split into a plurality of smaller (narrower) sub-ports. The data transfer capacity of each sub-port can be tailored according to the bandwidth requirements for a given end point 25. In this way, greater flexibility is provided for configuring the ports of, for example, a switch. In accordance with an embodiment of the invention, the data transfer capacity of a (large, wide) port can be divided among a plurality of sub-ports using time division multiplexing.

Figure 6:
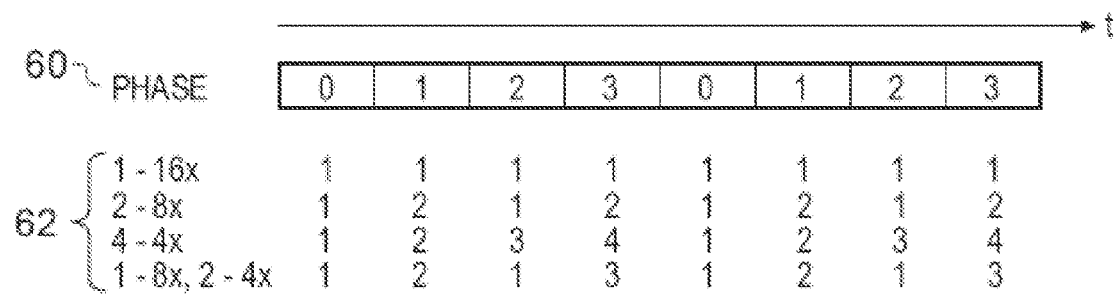
FIG. 6 shows a number of examples of how time division multiplexing can be used to divide the data transfer capacity of a communications port among a plurality of sub-ports.

An example of how time division multiplexing can be used for dividing out the data transfer capacity of a port among a plurality of sub-ports is now described in relation to FIG. 6.

To split the data transfer capacity of a single, larger port into a plurality of smaller ports, time division multiplexing (TDM) can be used to apportion access by a plurality of sub-ports to the full bandwidth of the larger port.

The larger port may have any data transfer capacity (e.g. 80 Gbits/s in each direction of data flow as described above). As described herein, the capacity can measured according to the number of data lanes which it supports for data transfer. The examples described herein generally include a larger port which supports 16 data lanes, although it will be appreciated that any number of data lanes could be used. Moreover, as described herein, data transfer capacity of the larger port can be allocated to a plurality of sub ports on a lane-by-lane basis. For example, a sub-port could be allocated one, two or four lanes worth of data transfer capacity (or indeed any other amount). It will be appreciated, however, that while this provides a useful measure of bandwidth, it may not actually be necessary to physically allocate lanes to sub-ports. For example, and as described below, TDM can be used to allow intermittent access by a sub-port to the full transfer capacity of a larger port for simulating a port which has a lower capacity. This lower capacity may correspond to a port having a discrete number of lanes, but in fact the sub-port can use all of the lanes of the larger port, albeit only for an allocated portion of time.

In FIG. 6, access over a period of time indicated "t" is apportioned according to a phase signal 60. Two phase cycles are shown in FIG. 6. Each cycle includes four phases, which divide the cycle into four portions, which are labeled "0", "1", "2" and "3". FIG. 6 illustrates four different ways for configuring a port to implement a plurality of sub-ports. For the purposes of this example, it is assumed that the larger port supports 16 data lanes worth of data transfer capacity.

In a first configuration 62 (1-16×) shown in FIG. 6 (row 1), a single sub-port labeled "1" is given exclusive access to the data transfer capacity of a larger port. Accordingly, and as indicated in FIG. 6, at each value of phase 60, the sub-port labeled "1" is given access to the entire data transfer capacity of the port. Accordingly, the sub-port is allocated the full data transfer capacity of 16 lanes.

In a second example configuration (2-8×) illustrated in FIG. 6, two sub-ports are each allocated 8 lanes worth of data transfer capacity from the 16 lane larger port. As is shown in FIG. 6, at phase values 0 and 2, a first of the sub-ports, labeled sub-port "1" has full access to the data transfer capacity of the 16 lane ports, while for phase values 1 and 3, the second sub-port labeled sub-port "2" is allocated for access to the data transfer capacity of the larger port. In this way, over a given period of time, full access to the data transfer capacity of the larger port is divided among two sub-ports.

In a third configuration (4-4×) shown in FIG. 6, the 16 lane larger port is divided among four sub-ports, whereby each sub-port is allocated 4 lanes worth of data transfer capacity. As is shown in FIG. 6, to achieve this, each sub-port is allocated the full data transfer capacity of the larger port for one quarter of each phase cycle.

In a further example (1-8×, 2-4×), a first sub-port (sub-port "1") is allocated 8 lanes worth of data transfer capacity, while two further sub-ports are each allocated 4 lanes worth of data transfer capacity. Again, this allocation can be achieved using time division multiplexing. Thus, the first sub-port can be allocated full access to the data transfer capacity of the larger port for one half of a phase cycle, while the two smaller sub-ports (which are labeled "2" and "3") are each allocated access to the full data capacity of the larger ports for one quarter of each phase cycle.

Accordingly, it can seen that the sub-ports can be allocated different amounts of data transfer capacity by allowing access by those sub-ports to the full data transfer capacity of a larger port during a limited amount of time over a phase cycle.

It will be appreciated that using time division multiplexing, any number of different configurations can be provided, and not just the example configurations described above in relation to FIG. 6.

Figure 7:
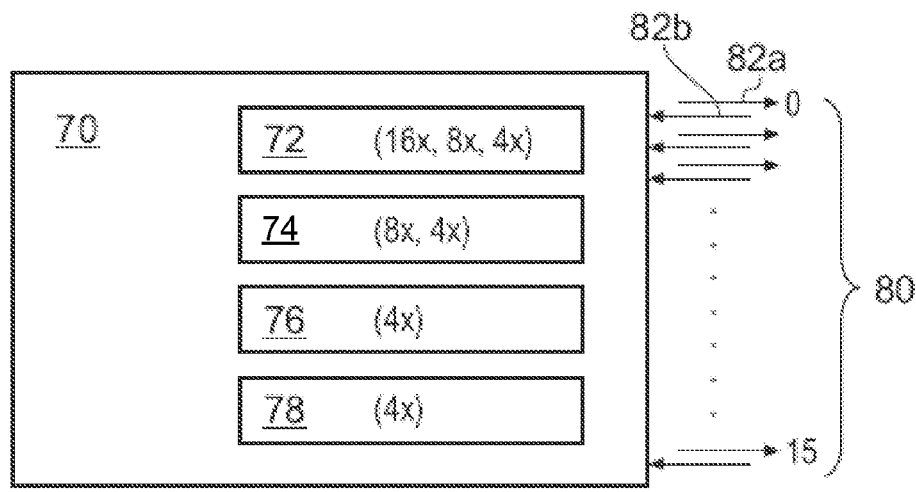
FIG. 7 illustrates a number of different configurations of a communications port, in which the data transfer capacity of the port is divided among one or more sub-ports.

FIG. 7 shows conceptually the manner in which a port 70 can be divided into a plurality of sub-ports. The port 70 in FIG. 7 is shown to include the capability to provide up to four different sub-ports, which are labeled 72, 74, 76 and 78 in FIG. 7. In this example, the port 70 can provide up to 16 lanes worth of data transfer capacity. As described above in relation to FIG. 1, each data lane can include two unidirectional data channels 82a and 82b.

All of the sub-ports shown in FIG. 7 can be operated to provide the data transfer capacity associated with four data lanes (4×). Two of the sub-ports (namely sub-ports 72 and 74) can be operated at the data transfer capacity associated with eight data lanes (8×). Finally, one of the sub-ports (namely sub-port 72) can be operated at a data transfer capacity associated with sixteen data lanes (16×). It will be appreciated that TDM allocation of transfer capacity as described in relation to FIG. 6 can be used to implement all of the sub-port combinations shown in FIG. 7.

A port can be implemented in hardware on, for example an integrated circuit such as an ASIC. Typically, the circuitry provided for each respective port is provided on a separate area of, for example, an ASIC. An embodiment of this invention allows the circuitry associated with a single port to provide the functionality of a plurality of ports. As will be described below, this can reduce the amount of circuitry required for providing multiple ports, thereby saving on-chip real estate as described below.

According to an embodiment of this invention, a plurality of sub-ports can be implemented in a single core on, for example, an ASIC or in a single IP block.

As used herein, the term core refers to circuitry which is operable to perform a given task. For example, the core may be configured to implement a communications port. The circuitry may be integrated circuitry on, for example, an ASIC. A core may be implemented as a well defined area of circuitry on an integrated circuit. In this regard, circuitry implementing the core can be said to occupy a well defined amount of real estate.

There will now be described a number of hardware configurations for implementing a port as a plurality of sub-ports using time division multiplexing.

Figure 8:
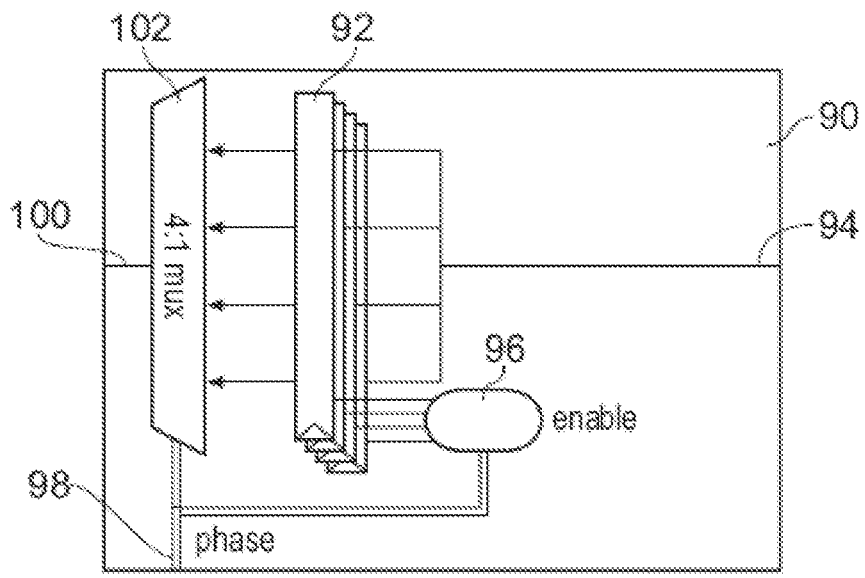
FIG. 8 shows an example of a logic element, which can be used as a building block in a core implementing a communications port as a plurality of sub-ports.

FIG. 8 shows an example of a logic element 90 which can be used for implementing time division multiplexing to divide a data transfer capacity or a large port among a plurality of smaller sub-ports. The logic element represents a portion of a pipeline provided in a core for implementing the port. The logic element 90 includes sequential logic. For example, the logic element 90 includes a plurality of registers 92. In this example, there are four registers 92. The registers 92 are each connected to receive data via input 94. The registers are each connected to a 4:1 multiplexer. The output of the multiplexer 102 is connected to an output 100 of the logic element 90. The logic element 90 can also receive a phase signal via phase input 98. The phase signal can be applied, as shown in FIG. 8, to the multiplexer 102 and to an enable element 96 for enabling output from the registers in accordance with the phase signal.

The operation of the logic element 90 will now be described with continued reference to FIG. 6.

In a first configuration, a single sub-port is allocated the full data transfer capacity of a larger port. In this configuration, the logic element 90 receives data at the data transfer capacity of the larger port via input 94, and that data is loaded sequentially into each of the four registers 92. In each phase in the 4-phase cycle shown in FIG. 6, a respective one of the registers can be loaded with data. The sequence in which the registers are loaded is controlled by the enable signal 96, which in turn is determined by the value of the phase signal 98. Thus, and with reference to FIG. 6, at phase 0, a first of the registers 92 is enabled to receive data via the input 94, at phase value 1, a second of the registers 92 is enabled to receive data via the input 94, and so forth, so that during a single four phase cycle as illustrated in FIG. 6, each of the four registers receives one quarter of the data received via the input 94. Data received by the registers can be passed on to the multiplexer 102. The operation of the multiplexer to receive data from the respective registers 92 is controlled according to the phase signal. The multiplexer 102 can then output the data via output 100 as desired.

In this first configuration, the full potential of the logic element 90 is not realized, since the full data transfer capacity of a port is allocated to a single sub-port. However, the logic element also has the ability to apply time division multiplexing to allow the data transfer capacity of a larger port to be used for implementing a plurality of smaller ports. This allows the context of data associated with each sub-port to be stored separately, whereby it can be operated on separately by combinatorial logic in the core.

An example using more than one sub-port will now be described in relation to the third configuration described above in relation to FIG. 6. In this configuration, there are four sub-ports, and each sub-port is allocated one quarter of the data transfer capacity of the larger port.

At phase "0" in a four phase cycle, the logic element 90 operates to receive data associated with a first sub-port via the input 94. The data can be received from, for example, combinatorial logic located upstream in the core pipeline, or indeed the logic element may be the first element in the pipeline, whereby it can operate to store the initial context of the data. In accordance with the phase signal received at 98, a first of the four registers 92 is enabled 96 to receive this data. Note that in this example, the four registers 92 are each of an appropriate size to be able to receive data associated with one quarter of the total data transfer capacity at a respective phase value in the cycle.

At phase value "1" a second of the four registers 92 is enabled 96 to receive data via the input 94, whereby data associated with a second sub-port can be received at 94 and loaded into a second of the four registers 92.

At phase values "2" and "3", the third and fourth registers 92 are each also enabled 96 to receive data via input 94 which is associated with a respective sub-port.

By loading the data associated with each of the four sub-ports into respective registers, the data are kept separate, even though they are in reality part of a single flow of data associated with the larger port. In this way, the context of the data associated with each sub-port can maintain its integrity as it passes along the pipeline, and be operated upon separately by combinatorial logic in the pipeline as required.

The multiplexer 102 can be used to output data from the registers as required, for passing onto a next stage in the pipeline (e.g. combinatorial logic).

Accordingly, the logic element 90 constitutes a bundle of sequential logic elements, which can allow the context of data associated with a variety of different sub-port capacities to be stored as they are passed along a pipeline and operated upon (by, for example, combinatorial logic as described below) as required for implementing the port. Registers provided in the logic element 90 can implement this separate storage. Note that more than one register can be allocated to a given sub-port.

The logic element 90 can store and pass data in accordance with a number of configurations of the kind described in relation to FIG. 6, whereby data flows associated with separate sub-ports can be implemented in a single core by time division multiplexing the data throughput of the core pipeline.

It is envisaged that logic elements such as logic element 90 can be used throughout a core in, for example, an ASIC, wherever it is necessary to store the context of the data before it is passed onto a next stage in the pipeline. Accordingly, the logic element 90 forms a building block for use in a core on, for example, an ASIC or in an IP block.

Figure 9:
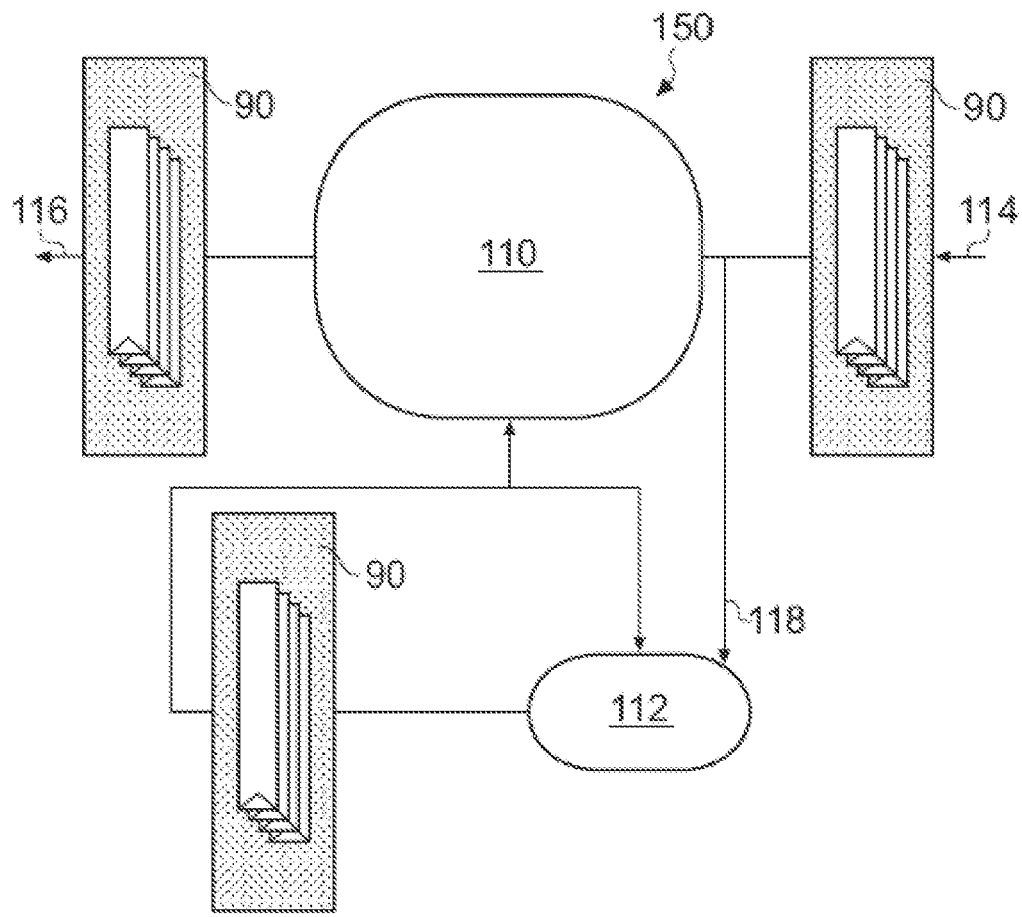
FIG. 9 shows an example of logic for implementing a communications port, the logic including a plurality of logic elements of the kind described in relation to FIG. 8.

FIG. 9 illustrates how a plurality of logic elements such as logic elements 90 described in relation to FIG. 8 can be used in combination with combinatorial logic for data context storage.

In FIG. 9, logic 150 includes three logic elements 90 (these are shown schematically in FIG. 9) and two non-sequential logic portions. In this example, the non-sequential logic portions include some combinatorial logic 110 and a finite state machine 112.

The logic 150 shown in FIG. 9 allows data relating to a plurality of separate sub-ports to be received at 114, stored (separately, as discussed above) in a first logic element 90, operated upon by the combinatorial logic 110 as controlled by the finite state machine 112, outputted from the combinatorial logic 110 into another logic element 90 for context storage and then passed on to a next stage in the pipeline via output 116. Examples of operations which could be performed by combinatorial logic 110 include multiplexing of data from various sources in a datapipe, or checking logic related to parts of a packet present at a particular point in time (clock cycle). Other functions where a feedback path is required as implemented by the finite state machine 112 can include the calculation of next state in the finite state machine or calculation of an intermediate sum in a CRC network.

As will be described in more detail below, FIG. 9 illustrates an advantage of implementing a single larger port as a plurality of smaller sub-ports with separate context storage. The advantage is that a plurality of smaller (sub-) ports can, be implemented in a core which uses less real estate than would separate core for each port. This is because non-sequential elements such as combinatorial logic 110 and finite state machine 112 can be shared in the core between the sub-ports. Prior to this invention, it would have been necessary to duplicate elements such as combinatorial logic 110 for each of a plurality of small ports, in separate respective cores. More detail regarding the kinds of savings which can be made in this regard are described below in relation to FIGS. 11 and 12.

Figure 10A:
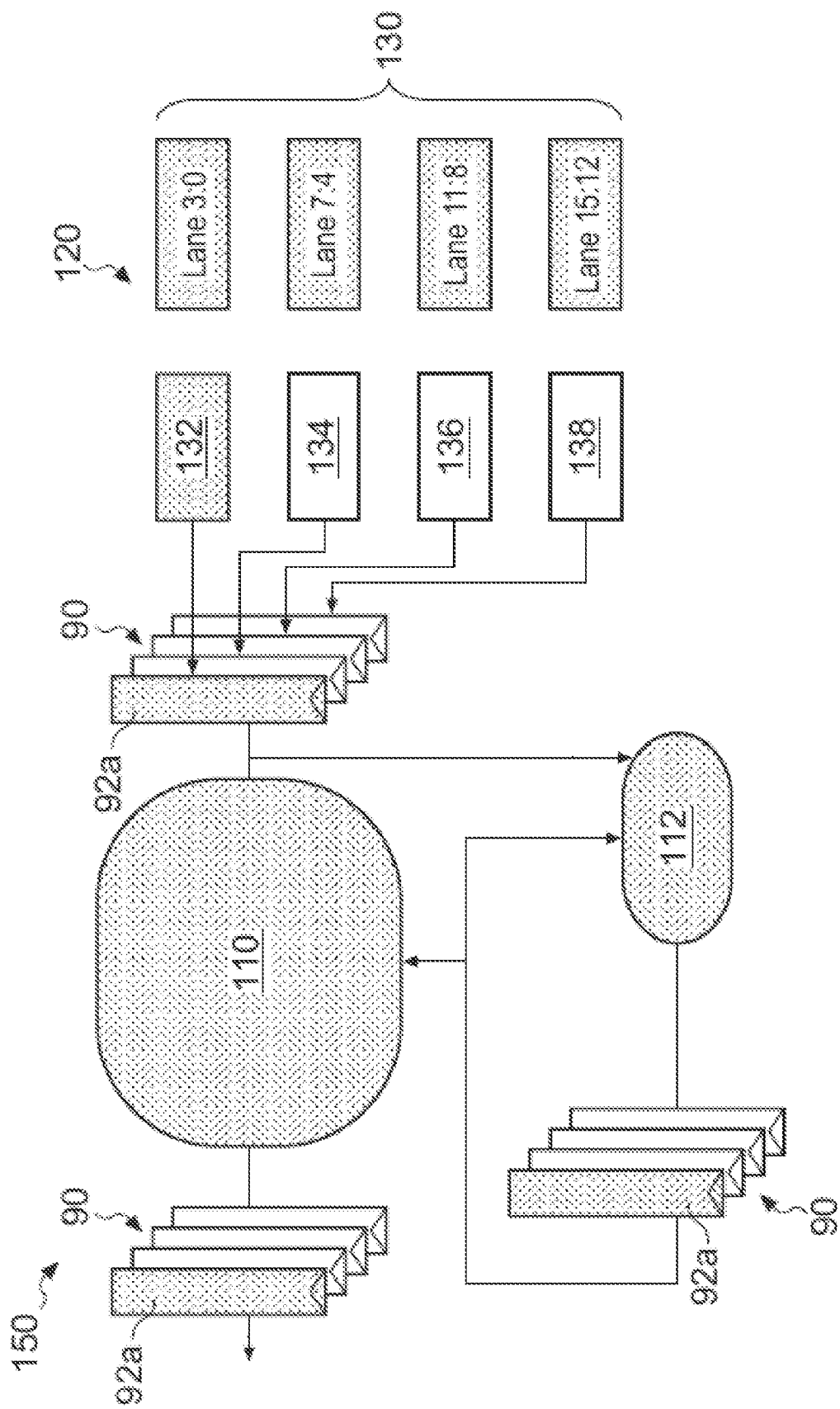
FIGS. 10A and 10B illustrate the operation of logic for implementing a communications port as a plurality of sub-ports.
Figure 10B:
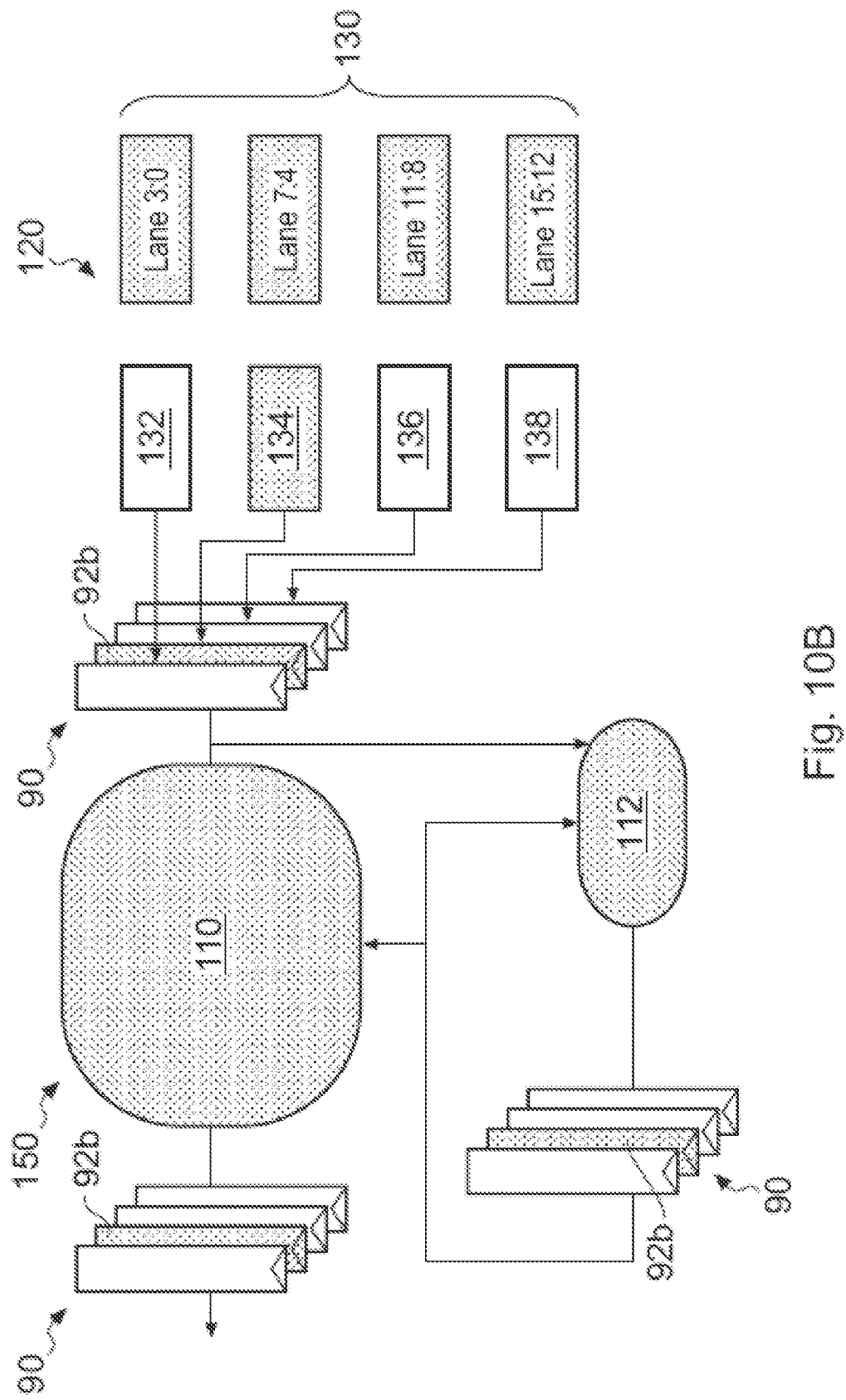

FIGS. 10*a* and 10*b* illustrate in additional detail the operation of the logic 150. In this example, the logic 150 receives data from a plurality of lanes associated with the larger port, and may be viewed as an initial staging post in the pipeline.

In FIGS. 10*a* and 10*b*, logic portions which are active in a given phase are shaded. Thus, FIG. 10*a* illustrates the active elements during a first phase (phase "0") of a phase cycle, while FIG. 10*b* shows the active elements in the logic 150 during a second phase (phase "1") of a phase cycle.

As shown in FIG. 10*a*, a plurality of lanes 130 (in this example, there are 16 lanes) can provide data to a core including combinatorial logic and a number of logic elements 90 for data context storage in the pipeline. Control logic 132, 134, 136 and 138 can be used to provide data as appropriate to a first logic element 90 in the core as shown in FIG. 10*a*. The control logic can be operable to distribute data to the logic element 90 in a format which is suitable for the pipeline. For example, while the lanes 130 may deliver data in 32 bits at 250 MHz, the control logic can pass this data onto the logic element at a slower clock rate, but using a word size which is suitable for the pipeline (e.g., 128 bits at 62.5 MHz).

It should be noted that the control logic 132-138 need not be actually incorporated in the core 150, but can be provided separately.

As is shown in FIG. 10*a*, in phase "0", control logic 132 is active to reformat data received from lanes 0-3 and to enter that data into the appropriate register of the first logic element 90 in the core 150. Accordingly, in phase 0, a first register labeled 92*a* of each logic element 90 in the core 150 is active for data context storage. Note also that the combinatorial logic included in the core 150, namely the combinatorial logic 110 and the finite state machine (FSM) next state generation 112 is also active in phase 0.

In the next phase, namely phase 1, control logic 134 is active to receive, reformat, and pass on data from lanes 4-7 to enter that data into a second register (labeled 92*b*) of a first logic element 90 of the core 150. Note that in FIG. 10*b*, the control logic 134 is active, as are all of the registers 92*b* in each of the logic elements 90 in the core, and, indeed, the combinatorial logic 110 and (FSM) next state generation 112. In subsequent phases (phases 2 and 3), the next two respective registers in each logic elements 90 become active as well as the next two control logic portions 136 and 138, as appropriate. This pattern is repeated over each cycle for processing the data stream within the pipeline.

It should be noted that the combinatorial logic 110 and FSM next state generation 112 are active in all phases of the phase cycle, while only certain registers in the logic elements are active in each phase cycle. Thus, the combinatorial logic is operable at the full data transfer capacity speed of the larger port, and is shared between up to four sub-ports.

As is indicated above, an embodiment of this invention allows real estate to be saved on, for example, an application specific integrated circuit. A first example of this will now be described in relation to FIGS. 11a and 11b.

Figure 11A:
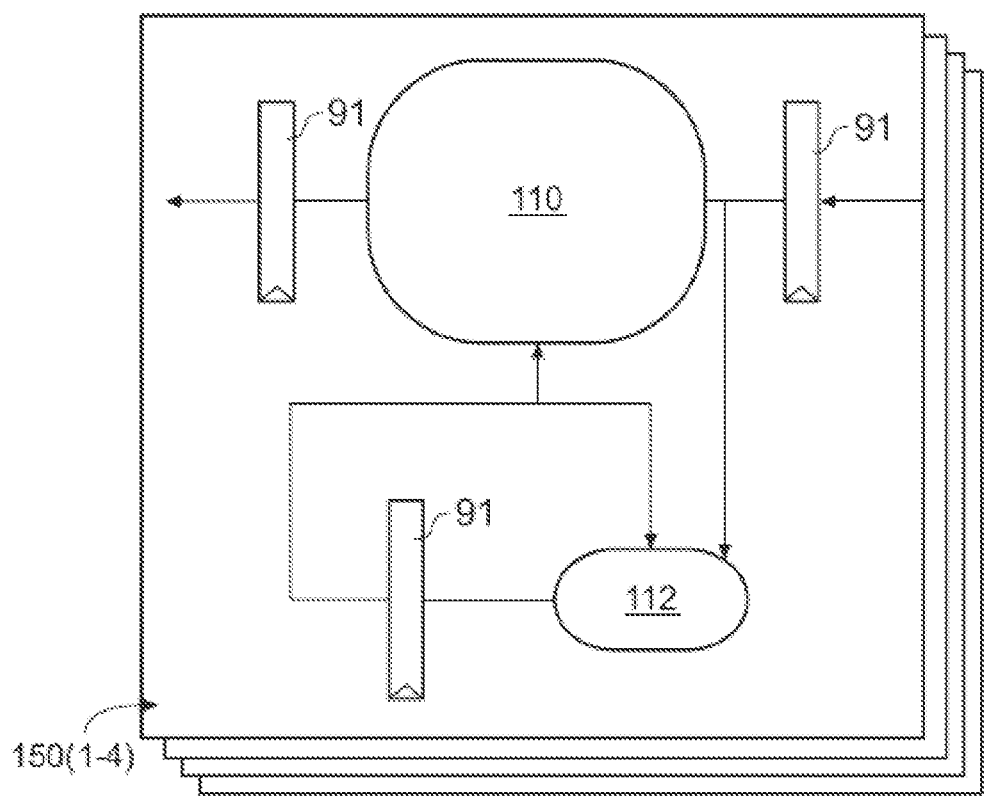
FIG. 11A and 11B illustrate an example of the real-estate savings which can be gained by using logic elements of the kind described in relation to FIG. 8 in conjunction with combinatorial logic elements.

FIG. 11a illustrates four separate cores 150(1-4), each core being operable to implement a port. As illustrated in FIG. 11a, each core 150(1-4) includes a number of sequential logic portions 91, which can include registers and so forth. Note that while in this example, each portion 91 includes a single register, the registers must be provided in multiple cores, one set for each port. Each core can also include combinatorial logic such as combinatorial logic 110 and combinatorial logic for implementing a finite state machine 112.

Core 150 is used to implement a single separate port, and therefore the arrangement shown in FIG. 11a can implement four ports. If it is assumed that the total area on an application specific integrated circuit, which is required to accommodate enough gates for implementing the core is N, then the total area which is required to implement the respective cores of four separate ports is 4N.

If it is assumed that roughly the same amount of area is used for each core in implementing the sequential logic 91 as is used for implementing the combinatorial logic such as combinatorial logic 110 and combinatorial logic for implementing the finite state machine 112, then the sequential elements require an area of N/2, while the combinatorial elements also require an area of N/2.

Figure 11B:
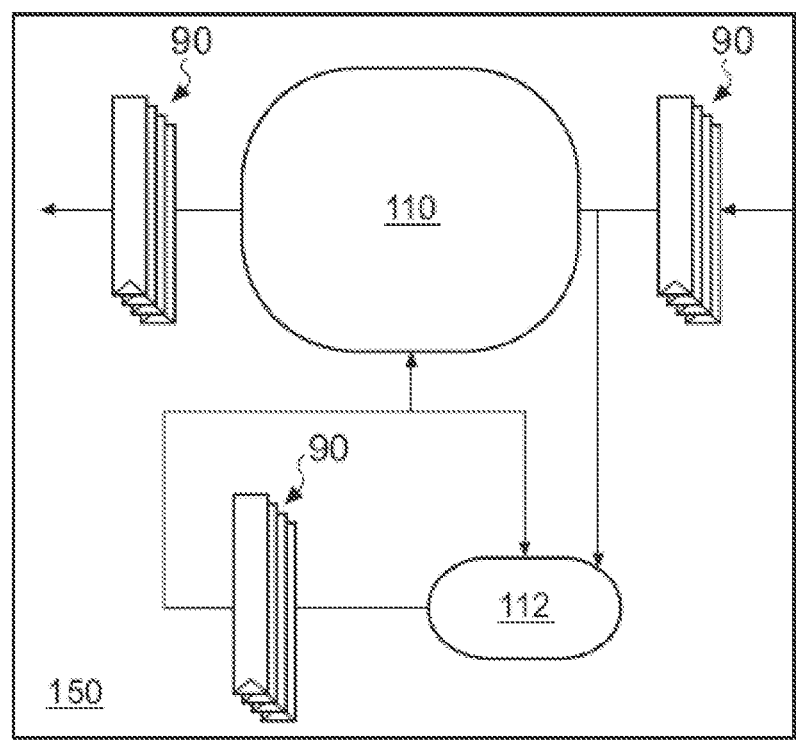

Turning now to FIG. 11b there is shown an example of a core 150, which in accordance with an embodiment of this invention, allows a single large port to be implemented as a plurality of smaller ports in a single core. As described above, implementing a plurality of ports by dividing out the data transfer capacity of a single larger port among a number of sub-ports using time division multiplexing, can allow the combinatorial logic elements in a core to be shared among each of the smaller sub-ports.

This reduces the amount of area used when implementing a plurality of ports.

Using the assumptions given above with regards to the amount of area consumed by the various elements in a core, we see that the area used by the core 150 shown in FIG. 11b is:

$$\text{Area}=4\times(\text{sequential logic area})+1\times(\text{combinatorial logic area})=4N/2+N/2=2.5N.$$

Accordingly, the arrangement shown in FIG. 11b can be used to implement, for example, four ports as sub-ports of a larger port with an area which is 1.5N less than the area which is required to implement the arrangement shown in FIG. 11a. This represents an area saving of 37%.

It will be appreciated that the more combinatorial logic which is used when implementing a port in a core, the greater the percentage saving in terms of area can be, since even more combinatorial logic can be shared between a plurality of sub-ports. A further example of this is illustrated in FIG. 12.

Figure 12:
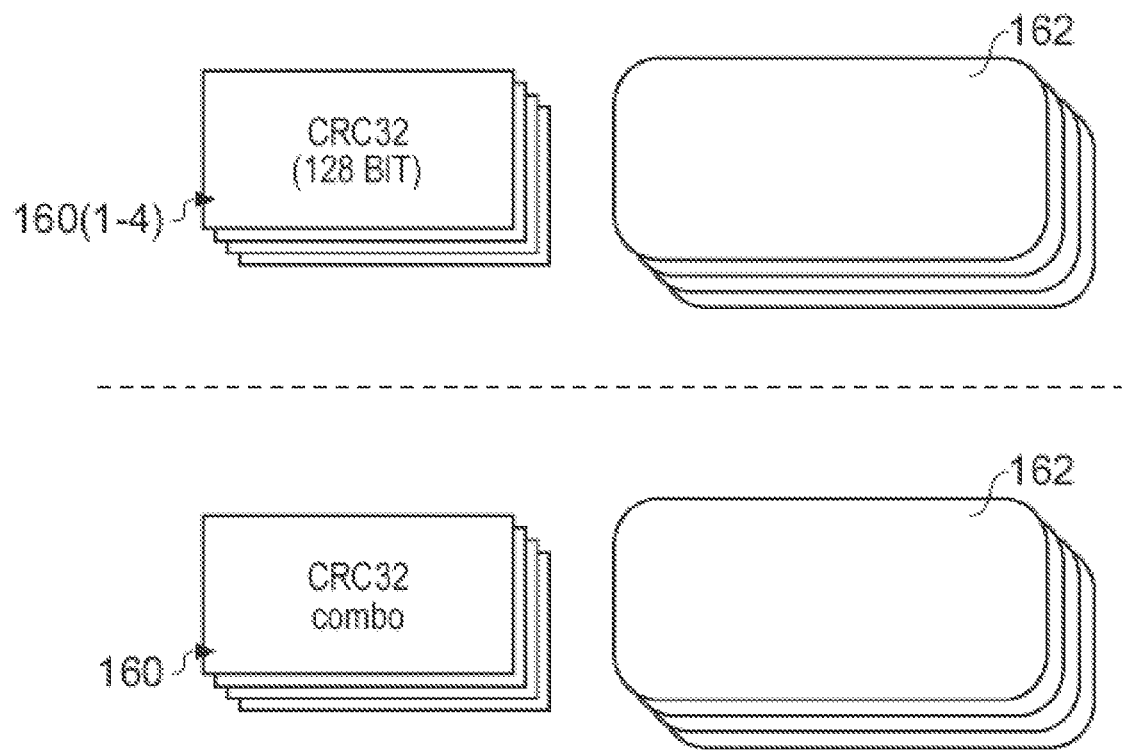
FIG. 12 illustrates another example of real-estate savings, which can be made by implementing a communications port as a plurality of sub-ports.

The upper portion of FIG. 12 illustrates the amount of logic which is required for implementing a CRC (cyclic redundancy check) calculator in four separate cores. The amount of logic required consumes an area 4N (N per core). Let it be assumed that of this total area, the sequential elements 162 per core for the calculator amount to N/5 in terms of area, while the combinatorial logic elements 160 require an area of 4N/5 per core. In this example then, the overall total of combinatorial elements 160 for implementing a CRC calculator in each of four cores require an area of 4×4N/5.

The lower portion of FIG. 12 illustrates the amount of logic which is required to implement a CRC calculator for each of plurality of sub-ports in a single core according to an embodiment of this invention. It should be noted that the combined combinatorial logic 160 shown in the lower portion of FIG. 12 can be shared for implementing a CRC calculator for each sub-port. Accordingly, the total amount of combinatorial logic area which is required to implement the core is 4N/5. In this example, the same amount of sequential logic 162 is required as that shown in the upper portion of FIG. 12, since the sequential logic is not shared between the sub-ports. Nevertheless, the total area consumed on, for example, and ASIC for implementing the combined core with a plurality of sub-ports is $$\text{Area}=4\times(\text{sequential logic area})+1\times(\text{combinatorial logic area})=4\times N/5+4N/5=1.6N.$$

This represents an area saving of 60%.

As described above, the actual amount of area which can be saved will depend on the amount of combinatorial logic which can be shared. In any case, embodiments of this invention can provide significant area savings.

Thus there has been described an apparatus and method for implementing a communications port. The apparatus comprises a core, which is operable to divide the port into a plurality of sub-ports by dividing a data transfer capacity of the port among the plurality of sub-ports using time division multiplexing. Each sub-port is allocated a corresponding data transfer capacity.

As described above, the implementations given herein relating to PCI Express are given by way of example only. It is envisaged that embodiments of this invention can be implemented in other architectures and under different standards than the PCI Express standard.

Although the embodiments above have been described in considerable detail, numerous variations and modifications will become apparent to those skilled in the art once the above disclosure is fully appreciated. It is intended that the following claims be interpreted to embrace all such variations and modifications as well as their equivalents.

What is claimed is:

1. An apparatus comprising a core for implementing a communications port, the core being operable to divide the port into a plurality of sub-ports by dividing a data transfer capacity of the port among the plurality of sub-ports using time division multiplexing, whereby each sub-port is allocated a corresponding data transfer capacity, wherein the core comprises:

a plurality of sequential logic elements operating at a plurality of data transfer rates corresponding to the data transfer capacities of the sub-ports, wherein the plurality of sequential logic elements are used to implement time division multiplexing by allowing data associated with each sub-port to be stored separately as the data is passed along a pipeline, wherein each sequential logic element is coupled to a corresponding control logic that is configured to distribute data to the sequential logic in a format which is suitable for the pipeline, and wherein only one of the plurality of sequential logic elements is active during any given phase of a phase cycle; and combinatorial logic operating at the full data transfer capacity of the port which is divided among the plurality of sub-ports, wherein the combinatorial logic is shared in the core by the plurality of sub-ports, wherein the combinatorial logic is configured to receive data from one of the plurality of sequential logic elements associated with a sub-port during any given phase of a phase cycle, wherein the combinatorial logic remains active during all phases of the phase cycle, and wherein the combinatorial logic comprises a finite state machine for controlling the combinatorial logic to operate upon the data associated with each sub-port.

2. The apparatus of claim 1, wherein the sequential logic comprises a plurality of registers, wherein each register corresponds to a sub-port.

3. The apparatus of claim 2, wherein a capacity of a register is matched to the transfer capacity of a respective sub-port.

4. The apparatus of claim 2, wherein at least one sub-port is supported by more than one register.

5. The apparatus of claim 2 comprising control logic operable to receive data at a rate corresponding to the data transfer capacity of the port and to load the received data into the registers in a format which is compatible with a pipeline of the core.

6. The apparatus of claim 1, wherein the port is associated with a plurality of data lanes, and wherein the core is operable to divide the data transfer capacity of the port among the plurality of sub-ports by allocating one or more of the data lanes to each sub-port.

7. The apparatus of claim 1, wherein at least one sub-port has a data transfer capacity which is larger or smaller than a data transfer capacity of at least one other sub-port.

8. The apparatus of claim 1 comprising a cyclic redundancy check (CRC) calculator.

9. The apparatus of claim 1 comprising a plurality of said cores.

10. The apparatus of claim 1, wherein the communications port is configured to support PCI Express.

11. The apparatus of claim 1, wherein the apparatus comprises an integrated circuit comprising the core for implementing the communications port.

12. The apparatus of claim 11, wherein the integrated circuit is an application specific integrated circuit.

13. The apparatus of claim 1, wherein the apparatus forms a switch.

14. A computer system comprising a core for implementing a communications port, the core being operable to divide the port into a plurality of sub-ports by dividing a data transfer capacity of the port among the plurality of sub-ports using time division multiplexing, whereby each sub-port is allocated a corresponding data transfer capacity, wherein the core comprises:

a plurality of sequential logic elements operating at a plurality of data transfer rates corresponding to the data transfer capacities of the sub-ports, wherein the plurality of sequential logic elements are used to implement time division multiplexing by allowing data associated with each sub-port to be stored separately as the data is passed along a pipeline, wherein each sequential logic element is coupled to a corresponding control logic that is configured to distribute data to the sequential logic in a format which is suitable for the pipeline, and wherein only one of the plurality of sequential logic elements is active during any given phase of a phase cycle; and combinatorial logic operating at the full data transfer capacity of the port which is divided among the plurality of sub-ports, wherein the combinatorial logic is shared in the core by the plurality of sub-ports, wherein the combinatorial logic is configured to receive data from one of the plurality of sequential logic elements associated with a sub-port during any given phase of a phase cycle, wherein the combinatorial logic remains active during all phases of the phase cycle, and wherein the combinatorial logic comprises a finite state machine for controlling the combinatorial logic to operate upon the data associated with each sub-port.

15. A method for implementing a communications port, the method comprising a core dividing the port into a plurality of sub-ports by dividing a data transfer capacity of the port among the plurality of sub-ports using time division multiplexing, whereby each sub-port is allocated a corresponding data transfer capacity, wherein the core comprises:

a plurality of sequential logic elements operating at a plurality of data transfer rates corresponding to the data transfer capacities of the sub-ports, wherein the plurality of sequential logic elements are used to implement time division multiplexing by allowing data associated with each sub-port to be stored separately as the data is passed along a pipeline, wherein each sequential logic element is coupled to a corresponding control logic that is configured to distribute data to the sequential logic in a format which is suitable for the pipeline, and wherein only one of the plurality of sequential logic elements is active during any given phase of a phase cycle; and combinatorial logic operating at the full data transfer capacity of the port which is divided among the plurality of sub-ports, wherein the combinatorial logic is shared in the core by the plurality of sub-ports, wherein the combinatorial logic is configured to receive data from one of the plurality of sequential logic elements associated with a sub-port during any given phase of a phase cycle, wherein the combinatorial logic remains active during all phases of the phase cycle, and wherein the combinatorial logic comprises a finite state machine for controlling the combinatorial logic to operate upon the data associated with each sub-port.

* * * * *